United States Patent [19]

Martin

[11] Patent Number: 4,489,921
[45] Date of Patent: Dec. 25, 1984

[54] RESILIENT ENGINE MOUNT

[75] Inventor: Richard D. Martin, Stratford, Canada

[73] Assignee: The Standard Products Company, Cleveland, Ohio

[21] Appl. No.: 437,696

[22] Filed: Oct. 29, 1982

[51] Int. Cl.³ .............................................. F16F 15/00
[52] U.S. Cl. ................................ 267/141.5; 267/141.7
[58] Field of Search .................... 188/379; 248/638; 267/140.3, 141, 141.1–141.5, 141.7

[56] References Cited

U.S. PATENT DOCUMENTS

| | | |
|---|---|---|
| 1,420,082 | 6/1922 | Dowd . |
| 1,872,259 | 8/1932 | Eldridge . |
| 2,138,175 | 11/1938 | Keys . |
| 2,212,142 | 8/1940 | Austin et al. . |
| 2,367,826 | 1/1945 | Kubaugh . |
| 2,425,566 | 8/1947 | Robinson . |
| 2,539,443 | 1/1951 | Lee . |
| 2,987,291 | 6/1961 | Dyson . |
| 3,035,799 | 5/1962 | Peirce . |
| 3,137,466 | 6/1964 | Rasmussen . |
| 3,141,523 | 7/1964 | Dickie . |
| 3,169,881 | 2/1965 | Bodine, Jr. . |
| 3,270,998 | 9/1966 | Keetch . |
| 3,399,851 | 9/1968 | Racca . |
| 3,448,949 | 6/1969 | Kelley . |
| 3,565,373 | 2/1971 | Frye . |
| 3,698,703 | 10/1972 | Hipsher . |
| 3,702,178 | 11/1972 | Schulz . |
| 3,705,702 | 12/1972 | Podolsky et al. . |
| 3,731,896 | 5/1973 | Fehlberg . |
| 3,897,856 | 8/1975 | Pineau . |
| 4,157,227 | 6/1979 | Hahle . |
| 4,159,091 | 6/1979 | Le Salver et al. . |
| 4,161,304 | 7/1979 | Brenner et al. . |
| 4,183,496 | 1/1980 | Brock et al. ................ 267/141.4 X |
| 4,199,128 | 4/1980 | Van Den Boom et al. . |
| 4,215,842 | 8/1980 | Brenner et al. . |
| 4,262,886 | 4/1981 | Le Salver et al. . |
| 4,277,056 | 7/1981 | Ticks . |
| 4,278,726 | 7/1981 | Wieme . |
| 4,286,777 | 9/1981 | Brown . |
| 4,288,063 | 9/1981 | Brenner et al. . |

FOREIGN PATENT DOCUMENTS

| | | |
|---|---|---|
| 2319957 | 11/1974 | Fed. Rep. of Germany . |
| 2452006 | 5/1976 | Fed. Rep. of Germany . |
| 2905090 | 8/1980 | Fed. Rep. of Germany . |
| 2932440 | 2/1981 | Fed. Rep. of Germany . |
| 2932478 | 2/1981 | Fed. Rep. of Germany . |
| 2933726 | 8/1981 | Fed. Rep. of Germany . |
| 2933727 | 8/1981 | Fed. Rep. of Germany . |
| 3005983 | 8/1981 | Fed. Rep. of Germany . |
| 3019337 | 11/1981 | Fed. Rep. of Germany . |
| 1411104 | 8/1965 | France ............................ 267/141.1 |
| 500004 | 2/1939 | United Kingdom . |
| 570243 | 6/1945 | United Kingdom . |
| 614797 | 12/1948 | United Kingdom . |
| 638988 | 6/1950 | United Kingdom . |
| 702720 | 1/1954 | United Kingdom . |
| 1014089 | 12/1965 | United Kingdom . |
| 1189563 | 4/1970 | United Kingdom . |

*Primary Examiner*—Duane A. Reger
*Attorney, Agent, or Firm*—Harness, Dickey & Pierce

[57] ABSTRACT

A resilient engine mount assembly is disclosed and generally includes a relatively rigid base member, intermediate member and suspended member. The base member is adapted to be secured to a vehicle frame or the like, and the suspended member is adapted to be secured to an engine or other prime mover. The base member is interconnected with the intermediate member by a first elastomeric support means which supports the intermediate member longitudinally, laterally, and vertically. Similarly, the suspended member is interconnected with the intermediate member by a second elastomeric support means which supports the suspended member longitudinally, laterally, and vertically. The first and second elastomeric support means have distinct damping characteristics in order to dampen various forms of engine vibrations in substantially any direction, whether such vibrations have high or low amplitudes or high or low frequencies.

16 Claims, 2 Drawing Figures

RESILIENT ENGINE MOUNT

FIELD OF THE INVENTION

This invention relates to a resilient engine mount assembly especially for supporting or mounting an engine on a motor vehicle frame or other member. More particularly an engine mount according to the invention isolates the vehicle frame from both high and low amplitude engine vibrations and may be adapted to isolate the frame from high or low frequency vibrations.

BACKGROUND AND SUMMARY OF THE INVENTION

Internal combustion engines and other types of vehicle power plants produce various forms of vibrations which may be undesirably transmitted in any direction to the vehicle frame or other components if not properly dampened. These vibrations may be high or low in amplitude and high or low in frequency. Although many kinds of engine mounts have been devised in an effort to dampen various forms of such destructive or annoying vibrations and shocks generated by an engine to prevent them from reaching the vehicle frame, there remains a need for improved engine mounts or supports that are capable of damping a wide range of shock impulses or vibrations having both high and low amplitude vibrations as well as high or low frequency vibrations. Thus, such an engine mount should be capable of damping or absorbing the relatively continuous low amplitude vibrations and also cushioning against occasional high amplitude shock impulses.

In accordance with the present invention, a mounting device for resiliently attaching a vibrating body such as automotive engine to a frame or other vehicle member comprises first and second elastomeric support means having different damping characteristics, one of which resists transmission of relatively high amplitude vibrations and the other of which resists transmission of relatively low amplitude vibrations. Preferably, the first elastomeric support means interconnects a relatively rigid base member and a relatively rigid intermediate member and supports said intermediate member longitudinally, laterally, and vertically relative to the base member. Similarly, the second elastomeric support means interconnects the intermediate member with a suspended member and supports the suspended member longitudinally, laterally, and vertically relative to the intermediate member. In such an arrangement, the base member is adapted to be secured to a vehicle frame or the like, and the suspended member is adapted to be attached to the engine or other prime mover. The engine mount of the present invention thus functions to dampen various forms of engine vibrations in substantially any direction, thereby tending to isolate the vehicle therefrom. The properties of the engine mount according to the invention also lower the transmissibility of the engine vibrations both at resonant frequency and at higher frequencies, transmissibility being defined as the ratio of the output force of such vibrations exerted on the vehicle frame or other member to the input force exerted on the engine mount by the engine.

Additional advantages and features of the present invention will become apparent from the following description and the appended claims taken in conjunction with the accompanying drawings.

BRIEF DESCRIPTION OF THE DRAWINGS

FIG. 1 is a plan view of a preferred embodiment of the present invention; and

FIG. 2 is a cross-sectional view taken along line 2—2 of FIG. 1.

DETAILED DESCRIPTION OF THE PREFERRED EMBODIMENT

FIGS. 1 and 2 of the drawings illustrate a preferred embodiment of an engine mount according to the present invention. One skilled in the art will readily recognize from the following discussion that the principles of the present invention are also applicable to other vibration isolating devices as well as to engine mounts other than that shown for purposes of illustration in the drawings.

Generally speaking, an engine mount 10 comprises a base member or bracket 12 adapted to be attached to a vehicle frame or other vehicle member, a suspended bushing 14 adapted to receive a fastener or mounting bolt 15 for attachment to an engine, a preferably cylindrical intermediate member 16, first elastomer support means 18 disposed between and connecting bracket 12 and intermediate member 16, and second elastomeric support means 20 disposed between and connecting intermediate member 16 and bushing 14.

As shown in FIG. 2, bracket 12 has a generally U-shaped configuration in its lateral cross-section with a bottom portion 22 and leg portions 24 and 26. Apertures 28 and 30 are disposed near the ends of leg portions 24 and 26 for receiving mounting bolts or the like for attaching bracket 12 to a vehicle frame or similar structure.

First elastomeric support means 18 resiliently supports intermediate member 16 longitudinally, laterally, and vertically with respect to bracket 12 and is preferably composed of a high damping resilient material such as an isobutylene rubber, one example of such rubber being Polysar Butyl 301. First elastomeric support means 18 comprises a pair of resilient support members 32 and 34 which cooperate to provide longitudinal, lateral, and vertical support as well as vibration damping between bracket 12 and intermediate member 16.

Support members 32 and 34 are preferably bonded to the interior of leg portions 24 and 26 and to the exterior of intermediate member 16 in a conventional manner. In such a case, the support members are bonded adhesively to the intermediate member 16 by process of applying heat and pressure to such components in a mold. An exemplary adhesive used in such process includes CHEM-LOCK 205 primer and CHEM-LOCK 252 top coat, as marketed by Hughson Chemicals.

Support member 32 preferably has radiused recessed portions 36 and 38 to provide a stress relief upon longitudnal deflection for increased longevity. Similarly, support member 34 has preferably radiused recessed portions 40 ad 42 for the same purpose.

Second elastomeric support means 20 is preferably composed of a low damping rubber such as natural polyisoprene, one example being standard Malaysian Rubber, Grade 5. Support means 20 has two strut members 44 and 46 which diverge generally downwardly and outwardly to form an angle of less than 180 degrees with respect to one another, such angle preferably being approximately 90 degrees. One skilled in the art will readily appreciate that a larger angle will provide less structural support for the engine but in turn will provide a lower dynamic rate and thus higher damping characteristics. In contrast, a smaller angle will provide greater structural support but will provide a higher dynamic rate and thus lower damping characteristics.

Strut members 44 and 46 provide longitudinal, lateral, and vertical support of bushing 14 relative to intermediate member 16 which preferably separates support members 32 and 34 from strut members 44 and 46 and is in turn supported relative to bracket 12 as set forth above. Second elastomeric support means 20 may optionally be molded in one piece having central portions 48 and 50 extending between and interconnecting strut members 44 and 46. In this way bushing 14 can be securely held in place by second elastomeric support means 20, with central portions 48 and 50 surrounding and encasing the longitudinally-extending outer surface of bushing 14. Strut members 44 and 46 are preferably bonded to the interior of intermediate member 16 and the exterior of bushing 14 in a similar manner and by similar means as that described above in connection with bonding the support members 32 and 34 to leg portions 24 and 26 and intermediate member 16.

Engine mount 10 is employed as a support for a vehicle engine on a vehicle frame by securing or attaching frame attaching bracket 12 to the vehicle frame and by securing or attaching the engine to bushing 14 with a stud, bolt, or the like. In use, vibrations of high amplitude which are imparted to bushing 14 are dampened and isolated from bracket 12 and hence from the vehicle frame by first elastomeric support means 18 which is comprised of a high damping rubber material as described above. Vibrations of low amplitude imparted to bushing 14 are dampened and isolated from bracket 12 and hence from the vehicle frame by the second elastomeric support means 20 which comprises a low damping rubber as described above. The first elastomeric support means 18 preferably has a higher Loss Tangent than that of second elastomeric support means 20 in order to dampen and isolate vibrations in an amplitude range generally higher than the amplitude range of vibrations dampened and isolated by second elastomeric support means 18. Typically, the Loss Tangent for said first elastomeric support means 18 is broadly in the range of approximately 0.15 to approximately 0.40, and more preferably within the range of approximately 0.17 to approximately 0.27. In contrast, the Loss Tangent for the second elastomeric support means 20 is broadly within the range of approximately 0.02 to approximately 0.10, and more preferably within the range of approximately 0.05 to approximately 0.08. The Loss Tangent is a measure of vibration damping characteristics, with which those skilled in the art are well-acquainted, and is defined as follows:

Loss Tangent $= (C \times \theta)/K$, where
C = damping coefficient;
$\theta = 2\pi F$;
F = frequency of vibrations being dampened; and
K = dynamic rate of the component damping the vibrations.

Thus, by selecting appropriate materials for the first and second elastomeric support means, in accordance with parameters well-known to those skilled in the art, the first and second elastomeric support means may be adapted to dampen and isolate either high or low frequency vibrations within their respective predetermined amplitude ranges. The engine mount 10 may therefore be adapted to dampen and isolate vibrations over a wide range of predetermined amplitudes and frequencies in accordance with the design parameters and conditions of the given application. It should also be emphasized that such vibrations are dampened and isolated from the vehicle frame in longitudinal, lateral and vertical directions as well as in substantially any combination of said longitudinal, lateral and vertical directions.

Finally, one skilled in the art will readily recognize that although the support means 18 and 20 are described as preferably being composed of elastomeric materials, non-elastomeric resilient materials may be substituted therefor so long as such materials possess the required damping characteristics for the given application as described above.

While the above description sets forth a preferred embodiment of an engine mount of the present invention, it will be appreciated by those skilled in the art that the present invention is subject to variation and modification. Hence, it is to be understood that various changes, modifications and variations may be made therein without departing from the spirit and scope of the invention as defined the the following claims.

What is claimed is:

1. A mounting device for resiliently attaching a pair of separate relatively movable bodies to one another, said mounting device comprising:

a base member adapted to be secured to a first of said relatively movable bodies;

an elongated suspended member adapted to be secured to a second of said relatively movable bodies;

a generally cylindrical intermediate member disposed between and spaced from said base member and said suspended member, said intermediate member generally circumscribing at least a substantial portion of said elongated suspended member in a spaced-apart relationship therewith;

a first elastomeric support means interconnecting said base member and said intermediate member for resiliently supporting said intermediate member longitudinally, laterally and vertically relative to said base member;

a second elastomeric support means interconnecting said intermediate member and said suspended member for resilient supporting said suspended member longitudinally, laterally and verticaly relative to said intermediate member;

said first and second elastomeric support means having distinct damping characteristics, thereby tending to resist transmission of both high and low amplitude vibrations from one of said relatively movable bodies to the other of said relatively movable bodies.

2. A mounting device according to claim 1, wherein said first elastomeric support means has a higher Loss Tangent than said second elastomeric support means, said first elastomeric support means being adapted to resist transmission of vibrations in a range of amplitudes generally higher than that of said second elastomeric means.

3. A mounting device for resiliently attaching a pair of separate relatively movable bodies to one another, said mounting device comprising:

a base member adapted to be secured to a first of said relatively movable bodies, said base member including a generally laterally-extending portion and at least one generally upwardly-extending portion;

a suspended member adapted to be secured to a second of said relatively movable bodies;

an intermediate member disposed between and spaced from said base member and said suspended member;

a first elastomeric support means interconnecting said base member and said intermediate member for resiliently supporting said intermediate member longitudinally, laterally and vertically relative to said base member, said first elastomeric support means supportingly interconnecting said intermediate member with both said laterally-extending and said upwardly-extending portions of said base member;

a second elastomeric support means interconnecting said intermediate member and said suspended member for resiliently supporting said suspended member longitudinally, laterally and vertically relative to said intermediate member;

said first and second elastomeric support means having distinct damping characteristics, thereby tending to resist transmission of both high and low amplitude vibrations from one of said relatively movable bodies to the other of said relatively movable bodies said first elastomeric support means having a higher Loss Tangent than said second elastomeric support means, and said first elastomeric support means being adapted to resist transmission of vibrations in a range of amplitudes generally higher than that of said second elastomeric means.

4. A mounting device according to claim 3, wherein said second elastomeric support means extends in a direction generally transverse to both said laterally-extending and said upwardly-extending portions of said base member, said intermediate member being disposed between said first and second elastomeric support members.

5. A mounting device according to claim 4, wherein said base member is generally U-shaped in lateral cross-section and has a bottom portion and pair of spaced-apart generally parallel leg portions extending generally upwardly therefrom, said intermediate member being disposed generally above said bottom portion and generally between said leg portions, said first elastomeric support means including a pair of support members, each of said support members supportingly interconnecting said intermediate member with both said bottom portion and one of said leg portions.

6. A mounting device according to claim 5, where said intermediate member is generally cylindrically shaped, said cylindrical intermediate member being hollow and having a longitudinal axis generally parallel to said bottom portion and to said leg portions of said U-shaped base member, said suspended member being elongated and longitudinally disposed within said hollow cylindrical intermediate member, said second elastomeric support member including a pair of strut members extending between said suspended member and the innner surface of said hollow cylindrical intermediate member, said strut members diverging outwardly generally toward opposite leg portions of said U-shaped base member and downwardly generally toward said base member.

7. A mounting device according to claim 6, wherein said second elastomeric support means further comprises a central portion integrally formed with said support members at the intersection thereof, said central portion substantially surrounding said suspended member along at least a portion of its longitudinally-extending exterior surface.

8. A mounting device according to claim 7, wherein said suspended member comprises a generally cylindrical hollow bushing adapted to receive a fastener therein for securing said second relatively movable body thereto.

9. A mounting device according to claim 8, wherein said first elastomeric support means has a higher Loss Tangent than said second elastomeric support means, said first elastomeric support means being adapted to resist transmission of vibrations in a range of amplitudes generally higher than that of said second elastomeric means.

10. An engine mount for resiliently attaching an engine to a vehicle frame, said engine mount comprising:

a longitudinally-extending bracket having a generally U-shaped lateral cross-section and being adapted to be secured to said vehicle frame, said bracket having a bottom portion and a pair of spaced-apart generally parallel leg portions extending generally upwardly therefrom;

a longitudinally-extending generally cylindrical bushing adapted to be secured to said engine;

a longitudinally-extending generally cylindrical intermediate member having at least one open end and being disposed generally above said bottom portion and generally between said leg portions, said bushing being disposed within said cylindrical intermediate member;

a pair of elastomeric support members, each of said support members extending between and secured to the outer surface of said intermediate member and the inner surfaces of said bottom and one of said leg portions of said bracket in order to longitudinally, laterally and vertically support said intermediate member relative to said bracket;

a pair of elastomeric strut members, each of said strut members extending between and secured to the outer surface of said bushing and the inner surface of said intermediate member in order to longitudinally, laterally and vertically support said bushing relative to said intermediate member, said strut members outwardly diverging in a generally downward direction;

said support members and said strut members having distinct damping characteristics, said support members being adapted to dampen vibrations in a first predetermined range of amplitudes and said strut members being adapted to dampen vibrations in a second predetermined range of amplitudes, thereby tending to resist transmission of vibrations in said first and second amplitude ranges between said engine and said frame.

11. An engine mount according to claim 10, wherein said first predetermined range of amplitudes is generally higher than said second predetermined range of amplitudes.

12. An engine mount according to claim 11, wherein said support members have a higher Loss Tangent than said strut members.

13. An engine mount according to claim 12, wherein said strut members are integrally formed at their intersection with a central portion, said central portion surrounding and encasing the longitudinally-extending outer surface of said bushing.

14. An engine mount according to claim 13, wherein said support members are bonded to said bracket and to said intermediate member; said strut members being bonded to said intermediate member and to said bushing.

15. An engine mount according to claim 14, wherein the Loss Tangent of said first elastomeric support means is in the range of approximately 0.15 to approximately 0.40, the Loss Tangent of said second elastomeric support means being in the range of approximately 0.02 to approximately 0.10.

16. An engine mount according to claim 15, wherein said strut members diverge outwardly to form an angle relative to one another of approximately 90 degrees.

* * * * *